(12) United States Patent
Ferris

(10) Patent No.: US 11,036,550 B2
(45) Date of Patent: *Jun. 15, 2021

(54) METHODS AND SYSTEMS FOR PROVIDING ON-DEMAND CLOUD COMPUTING ENVIRONMENTS

(71) Applicant: Red Hat, Inc., Raleigh, NC (US)

(72) Inventor: James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 156 days.

This patent is subject to a terminal disclaimer.

(21) Appl. No.: 16/024,232

(22) Filed: Jun. 29, 2018

(65) Prior Publication Data

US 2018/0321974 A1 Nov. 8, 2018

Related U.S. Application Data

(63) Continuation of application No. 12/324,437, filed on Nov. 26, 2008, now Pat. No. 10,025,627.

(51) Int. Cl.
| | | |
|---|---|---|
| *G06F 9/455* | (2018.01) | |
| *G06F 9/46* | (2006.01) | |
| *G06F 9/50* | (2006.01) | |

(52) U.S. Cl.
CPC ..................... *G06F 9/50* (2013.01)

(58) Field of Classification Search
CPC ....................................................... G06F 9/50
USPC ..................................................... 718/1, 104
See application file for complete search history.

(56) References Cited

U.S. PATENT DOCUMENTS

| | | |
|---|---|---|
| 6,463,457 B1 | 10/2002 | Armentrout et al. |
| 6,871,232 B2 * | 3/2005 | Curie ............... G06Q 10/06 709/225 |
| 6,990,666 B2 | 1/2006 | Hirschfeld et al. |
| 7,313,796 B2 | 12/2007 | Hamilton, II et al. |
| 7,439,937 B2 | 10/2008 | Ben-Shachar et al. |
| 7,529,785 B1 | 5/2009 | Spertus et al. |
| 7,533,385 B1 | 5/2009 | Barnes |
| 7,546,462 B2 | 6/2009 | Upton |
| 7,577,722 B1 | 8/2009 | Khandekar et al. |
| 7,596,620 B1 | 9/2009 | Colton et al. |
| 7,712,100 B2 | 5/2010 | Fellenstein et al. |
| 7,836,452 B2 | 11/2010 | Taylor |
| 7,912,955 B1 | 3/2011 | Machiraju et al. |

(Continued)

OTHER PUBLICATIONS

Chase et al, "Dynamic Virtual Clusters in a Grid Site Manager", 2003, Department of Science—Duke University, pp. 1-10.

(Continued)

*Primary Examiner* — Bradley A Teets
(74) *Attorney, Agent, or Firm* — Lowenstein Sandler LLP

(57) ABSTRACT

A cloud management system receives a request initiated by a requestor to provide an execution platform to execute one or more applications, identifies a set of computing resources comprising at least one cloud-controlled computing resource and at least one internally-controlled computing resource, and creates the execution platform comprising at least one cloud-controlled computing resource and at least one internally-controlled computing resource. Further, the cloud management system instantiates the one or more applications on the execution platform provides, to the requestor, access to the one or more applications, and responsive to determining that the request has expired, de-allocates the set of computing resources.

20 Claims, 5 Drawing Sheets

(56) References Cited

U.S. PATENT DOCUMENTS

| | | |
|---|---|---|
| 8,255,529 B2 | 8/2012 | Ferris et al. |
| 8,271,653 B2 | 9/2012 | DeHaan |
| 8,316,125 B2 | 11/2012 | DeHaan |
| 8,364,819 B2 | 1/2013 | Ferris et al. |
| 8,375,223 B2 | 2/2013 | DeHaan et al. |
| 8,402,139 B2 | 3/2013 | Ferris et al. |
| 8,464,250 B1 | 6/2013 | Ansel |
| 8,504,443 B2 | 8/2013 | Ferris et al. |
| 8,504,689 B2 | 8/2013 | Ferris et al. |
| 8,606,667 B2 | 12/2013 | Ferris et al. |
| 8,606,897 B2 | 12/2013 | Ferris et al. |
| 8,612,577 B2 | 12/2013 | Ferris et al. |
| 8,612,615 B2 | 12/2013 | Ferris et al. |
| 8,631,099 B2 | 1/2014 | Morgan |
| 8,713,147 B2 | 4/2014 | Ferris et al. |
| 8,769,083 B2 | 7/2014 | Ferris et al. |
| 8,782,192 B2 | 7/2014 | Morgan |
| 8,825,791 B2 | 9/2014 | Morgan |
| 8,832,219 B2 | 9/2014 | Morgan |
| 8,832,459 B2 | 9/2014 | Dehaan |
| 8,862,720 B2 | 10/2014 | DeHaan et al. |
| 8,880,700 B2 | 11/2014 | Ferris et al. |
| 8,904,005 B2 | 12/2014 | Ferris et al. |
| 8,909,783 B2 | 12/2014 | Ferris et al. |
| 8,909,784 B2 | 12/2014 | Ferris et al. |
| 8,924,539 B2 | 12/2014 | Ferris et al. |
| 8,949,426 B2 | 2/2015 | Morgan |
| 8,954,564 B2 | 2/2015 | Ferris et al. |
| 8,959,221 B2 | 2/2015 | Morgan |
| 8,977,750 B2 | 3/2015 | Ferris |
| 8,984,104 B2 | 3/2015 | Morgan |
| 9,037,723 B2 | 5/2015 | Morgan |
| 9,053,472 B2 | 6/2015 | Ferris et al. |
| 9,104,407 B2 | 8/2015 | DeHaan et al. |
| 9,201,485 B2 | 12/2015 | DeHaan et al. |
| 9,202,225 B2 | 12/2015 | Ferris et al. |
| 9,311,162 B2 | 4/2016 | DeHaan et al. |
| 9,354,939 B2 | 5/2016 | Ferris et al. |
| 9,389,980 B2 | 7/2016 | Ferris et al. |
| 9,436,459 B2 | 9/2016 | Ferris et al. |
| 9,442,771 B2 | 9/2016 | Morgan |
| 9,450,783 B2 | 9/2016 | DeHaan |
| 9,485,117 B2 | 11/2016 | Ferris |
| 9,529,689 B2 | 12/2016 | Ferris et al. |
| 9,563,479 B2 | 2/2017 | Ferris et al. |
| 9,606,831 B2 | 3/2017 | Ferris et al. |
| 9,703,609 B2 | 7/2017 | Ferris |
| 9,736,252 B2 | 8/2017 | Ferris et al. |
| 9,930,138 B2 | 3/2018 | Ferris |
| 9,971,880 B2 | 5/2018 | Ferris et al. |
| 2001/0039497 A1 | 11/2001 | Hubbard |
| 2002/0069276 A1 | 6/2002 | Hino et al. |
| 2002/0165819 A1 | 11/2002 | McKnight et al. |
| 2003/0037258 A1 | 2/2003 | Koren |
| 2003/0110252 A1 | 6/2003 | Yang-Huffman |
| 2003/0135609 A1 | 7/2003 | Carlson et al. |
| 2004/0162902 A1 | 8/2004 | Davis |
| 2004/0210591 A1 | 10/2004 | Hirschfeld et al. |
| 2004/0210627 A1 | 10/2004 | Kroening |
| 2004/0268347 A1 | 12/2004 | Knauerhase et al. |
| 2005/0131898 A1 | 6/2005 | Fatula, Jr. |
| 2005/0144060 A1 | 6/2005 | Chen et al. |
| 2005/0155033 A1 | 7/2005 | Luoffo et al. |
| 2005/0182727 A1 | 8/2005 | Robert et al. |
| 2005/0289540 A1 | 12/2005 | Nguyen et al. |
| 2006/0059492 A1 | 3/2006 | Fellenstein et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0149842 A1 | 7/2006 | Dawson et al. |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0271560 A1 | 11/2007 | Wahlert et al. |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2008/0244579 A1 | 10/2008 | Muller |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0125902 A1 | 5/2009 | Ghosh et al. |
| 2009/0132695 A1 | 5/2009 | Surtani et al. |
| 2009/0144393 A1* | 6/2009 | Kudo .................. G06F 9/5044 709/218 |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0271498 A1 | 10/2009 | Cable |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris et al. |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0220622 A1 | 9/2010 | Wei |
| 2010/0299366 A1 | 11/2010 | Stienhans et al. |
| 2010/0306767 A1 | 12/2010 | DeHaan |
| 2011/0016214 A1 | 1/2011 | Jackson |
| 2011/0131134 A1 | 6/2011 | Ferris et al. |
| 2011/0131306 A1 | 6/2011 | Ferris et al. |
| 2011/0131335 A1 | 6/2011 | Spaltro et al. |
| 2011/0213687 A1 | 9/2011 | Ferris et al. |
| 2011/0213691 A1 | 9/2011 | Ferris et al. |
| 2011/0213719 A1 | 9/2011 | Ferris et al. |
| 2011/0214124 A1 | 9/2011 | Ferris et al. |
| 2012/0130873 A1 | 5/2012 | Morgan |

(56) References Cited

U.S. PATENT DOCUMENTS

2012/0311571 A1  6/2012 Morgan
2012/0221454 A1  8/2012 Morgan
2012/0304170 A1  11/2012 Morgan

OTHER PUBLICATIONS

White Paper "Best Practices for Building Virtual Appliances", 2008 rPath, Inc., www.rpath.com, 6 pages.
"rBuilder and the rPath Appliance Platform", 2007 rPath, Inc., www.rpath.com, 3 pages.
White Paper "rPath Versus Other Software Appliance Approaches", Mar. 2008, rPath, Inc., www.rpath.com, 9 pages.

* cited by examiner

METHODS AND SYSTEMS FOR PROVIDING ON-DEMAND CLOUD COMPUTING ENVIRONMENTS

RELATED APPLICATIONS

This application is a continuation of U.S. patent application Ser. No. 12/324,437, filed Nov. 26, 2008, the entirety of which is incorporated herein by reference.

FIELD

This invention relates generally to products and services, more particularly, to systems and methods for cloud computing related services and products.

DESCRIPTION OF THE RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application.

Typically, in the cloud computing environment, the resources, provided by the cloud, come from dedicated servers and other computers. Typically, the provider or originator of the cloud maintains dedicated servers in order to provide resources for the cloud. Additionally, in specific application based computing environments, individual users may be able to add their particular computing resources to the computing environment. For example, the Search for Extraterrestrial Intelligence (SETI) program allows individual users to contribute the processing power of their personal systems for performing mathematical computations on experimental data.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present teachings relate to systems and methods for providing a cloud computing environment on-demand. More particularly, embodiments relate to platforms and techniques in which a cloud computing environment can be created, on-demand, from non-dedicated cloud controlled resources or third-party resources.

According to embodiments, a cloud management system can be configured to receive requests to provide an execution platform for applications, virtual machines, appliances, etc. The cloud management system can be configured to create a cloud, on-demand, to meet the request. The cloud management system can be configured to determine a set of resources from non-dedicated cloud controlled resources or third-party resources that meet specifications of the requested execution platform. The cloud management system can be configured to create the on-demand cloud from the determined set of resources to serve as the execution platform. After creation, the cloud management system can be configured to instantiate the requested applications, virtual machines, appliances, etc. in the on-demand cloud. Additionally, the cloud management system can be configured to destroy the cloud once the computing platform is no longer needed.

By allowing a cloud to be created on-demand, a cloud computing environment can be created that does not require dedicated resources to support the cloud. Additionally, by utilizing non-dedicated and third party resources on-demand, the cloud computing environment can leverage additional resources without requiring the resources to be tied-down for unspecified periods of time. As such, clouds can be flexibly created to meet the individual demands of cloud users without wasting resources.

Figure 1:
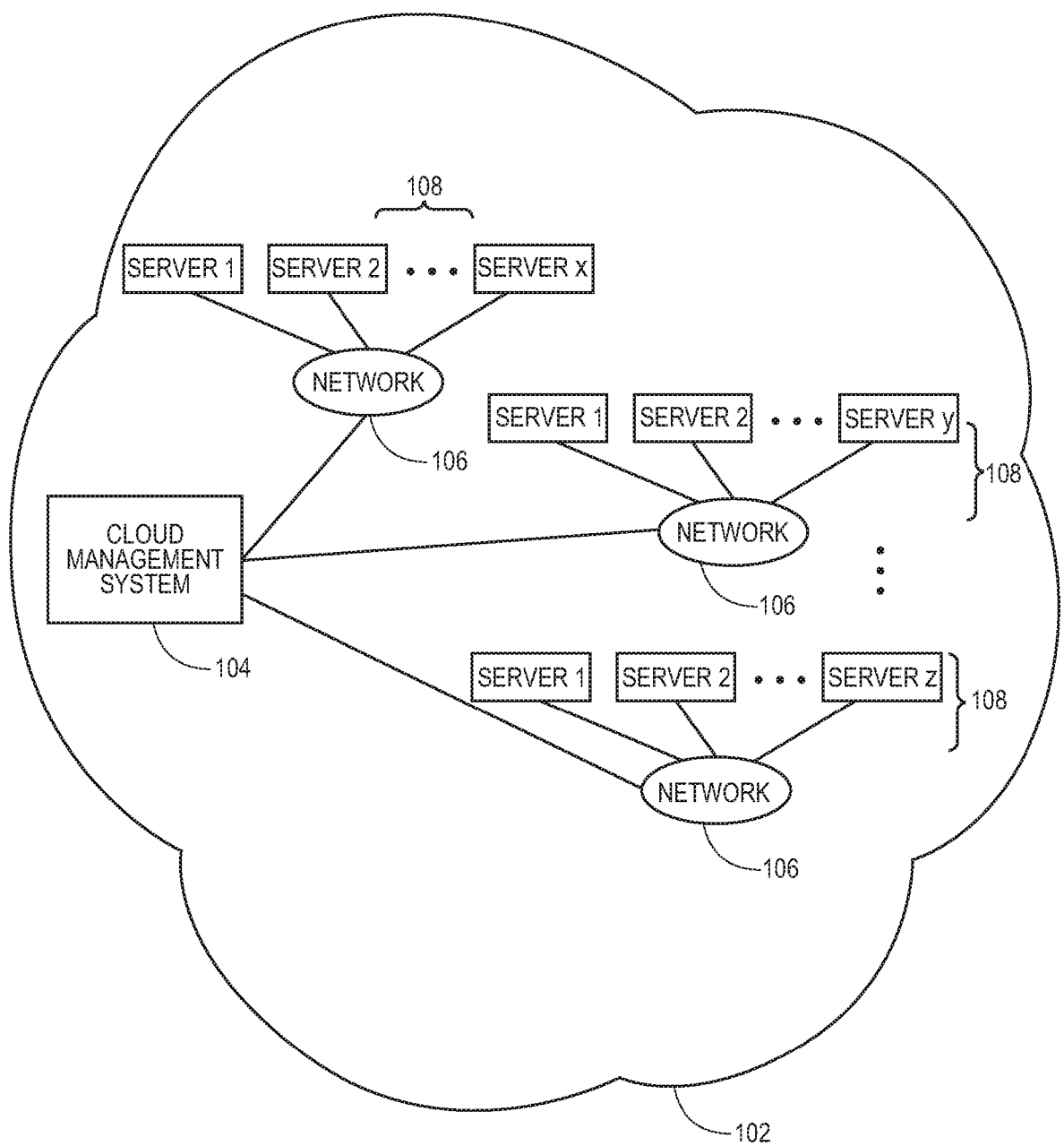
FIG. 1 illustrates an overall cloud system architecture in which various embodiments of the present teachings can be practiced.

FIG. 1 illustrates an overall cloud computing environment, in which systems and methods for the management of subscriptions of cloud-based virtual machines can operate, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines can be managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, because the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 can respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 can respond to a request for instantiation at a programmed time with an offer to deliver the specified quantity of processor cycles within a specific amount of time, such as the next 12 hours.

The cloud management system 104 can select a group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet Protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in a set of resource servers 108 indicating a status regarding the provisioning of their respective resources. Various sets of resource servers can confirm, for example, the availability of a dedicated amount of processor cycles, amounts of electronic memory, communications bandwidth, or applications or other software prepared to be served.

Figure 2:
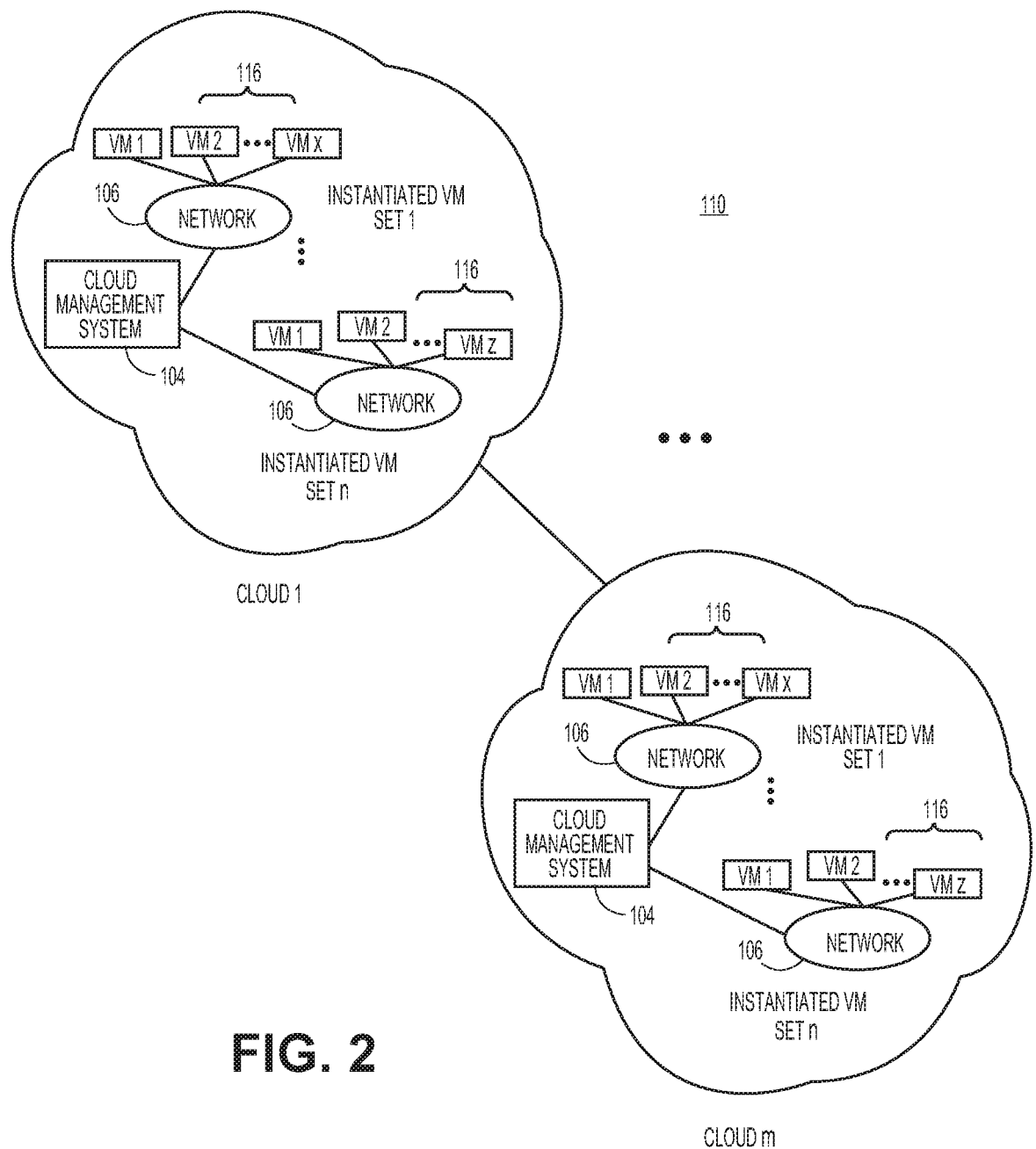
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other number of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
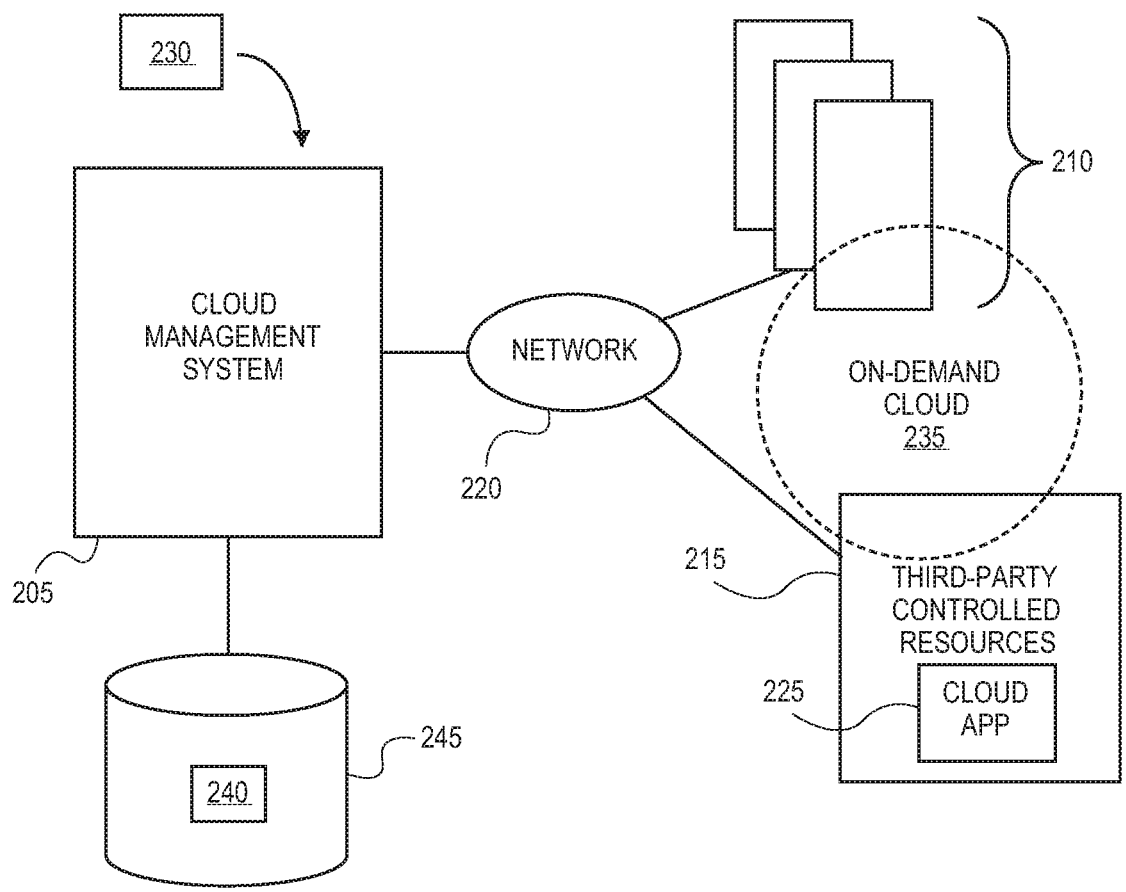
FIG. 3 illustrates an overall system architecture in which a cloud computing environment can be created on-demand, according to various embodiments.

FIG. 3 illustrates aspects of a cloud computing environment in which cloud computing environments can be created on-demand, according to various embodiments. In embodiments, a cloud management system 205 can be configured to provide on-demand clouds without maintaining static and dedicated cloud resources.

In embodiments, the cloud management system 205 can be configured to communicate with non-dedicated resources 210 and third-party controlled resources 215 via a network 220. Network 220 can include one or more networks, such as the Internet or other public or private networks. The non-dedicated resources 210 can be any type of computer systems under the control of an owner or operator of the cloud management system 205. For example, the non-dedicated resources 210 can be one or more personal computers (desktop, laptop, etc.), one or more server computers, and the like. The non-dedicated resources 210 can include hardware resources, such as processors, memory, network hardware and bandwidth, storage devices, and the like, and software resources, such as operating systems (OS), application programs, and the like.

In embodiments, the third-party controlled resources 215 can be any type of computer systems under the control of a user, independent of the owner or operator of the cloud 102. For example, the third-party controlled resources 215 can be one or more personal computers (desktop, laptop, etc.), one or more server computers, and the like, which are under the control of individuals, companies, and the like. The third-party controlled resources 215 can include hardware resources, such as processors, memory, network hardware and bandwidth, storage devices, and the like, and software resources, such as operating systems (OS), application programs, and the like. The user of the third-party controlled resources 215 can desire to make the third-party controlled resources 215 available to the cloud management system 205. As such, the cloud management system 205 can utilize the third-party controlled resources 215 in the pool of resources for the on-demand clouds.

In embodiments, to make the resources available, the third-party controlled resources 215 can include a cloud application 225. The cloud application 225 can be configured to allow the user to make a set of the resources of the third-party controlled resources 215 available to the cloud management system 205. The cloud application 225 can be configured to allow the cloud management system 205 to request resources from the set of resources. In response to requests, the cloud application 225 can be configured to provide access to the set of resources for use by the cloud management system 205.

In embodiments, the cloud application 225 can be configured to contain necessary logic for identifying and providing accesses to a set of resources of the third-party controlled resources 215 and for communicating with the cloud management system 205. For example, the cloud application 225 can be configured to contain logic for communicating with the hardware resources of the third-party controlled resources 215 (e.g. processor, memory, storage devices, network interfaces, etc.) and software resources of the third-party controlled resources 215 (operating systems, application programs, etc.). For example, the cloud application 225 can be configured to communicate with the OS to identify and allocate resources accessible by the cloud management system 205. Additionally, the cloud application 225 can be configured to allow the user to specify a particular set of resources accessible by the cloud management system 205.

In embodiments, the cloud application 225 can be configured to grant access to the set of resources. For example, the cloud application 225 can be configured to communicate with the hardware and software resources to grant direct access to the set of resources to the cloud management system 205 for instance, via TCP/IP, FTP or other protocols or channels. Likewise, the cloud application 225 can be configured to receive the processes to be performed on the third-party controlled resources 215 and to instantiate the processes on the set of resources.

In embodiments, the cloud application 225 can be configured to provide secure communications between the cloud application 225 and the cloud management system 205. The cloud application 225 can be configured to include the necessary logic to perform any known security protocols between the third-party controlled resources 215 and the cloud management system 205. For example, the cloud application 225 can be configured to perform authentication (secure login, passwords checks, digital signatures authentication, digital certificate authentication, etc), communication encryption (symmetric cryptography, asymmetric cryptography, etc.), and the like.

In embodiments, the non-dedicated resources 210 can include a cloud application 225 as described above. Likewise, the cloud management system 205 can be configured to contain logic to directly access, control, and allocate the hardware and software resources of the non-dedicated resources 210.

In embodiments, the cloud management system 205 can be configured to receive a request 230 to provide an on-demand cloud for supporting a computing process. The computing process can include applications, appliances, virtual machines, and the like. The request 230 can also include the specifications of the computing process. For example, the request 230 can include information identifying the desired resources for the computing process (processing power, memory, network bandwidth, etc.), the time period for the computing process (start time, end time, duration), and the like. The request 230 can be initiated by the operator or owner of the cloud management system 205. Likewise, the cloud management system 205 can be configured to receive the request 230 from a separate entity.

In embodiments, the cloud management system 205 can be configured to create an on-demand cloud 235 to support the requested computing process. The cloud management system 205 can be configured to identify a set of resources from the non-dedicated resources 210 and third-party controlled resources 215 that matches the specifications of the computing process. To identify the set of resources, the cloud management system 205 can be configured to directly query the non-dedicated resources 210 and third-party controlled resources 215 to determine the available resources.

In embodiments, additionally, the cloud management system 205 can be configured to maintain a record 240 that identifies the available resources of the non-dedicated resources 210 and third-party controlled resources 215. The record 240 can be configured as any type of data structure capable of storing information about the available resources. For example, the record 240 can include information such as identity of non-dedicated resources 210 and third-party controlled resources 215, available resources (hardware and software resources), availability of the resources (time periods, duration, etc.). The cloud management system 205 can be configured to maintain the record in a repository 245, such as a database.

In embodiments, once identified, the cloud management system 205 can be configured to create the on-demand cloud 235. To create the on-demand cloud 235, the cloud management system 205 can be configured to request allocation of the identified resources from the non-dedicated resources 210 and third-party controlled resources 215. If the cloud management system 205 has direct control of the resources, the cloud management system 205 can be configured to directly allocate the resources to the on-demand cloud 235.

Once created, the cloud management system 205 can be configured to instantiate the computing process in the on-demand cloud 235. Likewise, the cloud management system 205 can be configured to provide interfaces (APIs, communication channels, etc.) for the requester to access the on-demand cloud 235.

In embodiments, once the on-demand cloud 235 is no longer needed, the cloud management system 205 can be configured to destroy the on-demand cloud 235. For example, the cloud management system 205 can destroy the on-demand cloud 235 at the expiration of the duration of the on-demand cloud or at the direction of the requester of the computing process. To destroy the on-demand cloud 235, the cloud management system 205 can be configured to request de-allocation of the identified resources from the non-dedicated resources 210 and third-party controlled resources 215. If the cloud management system 205 has direct control of the resources, the cloud management system 205 can be configured to directly de-allocate the resources to the on-demand cloud 235.

Figure 4:
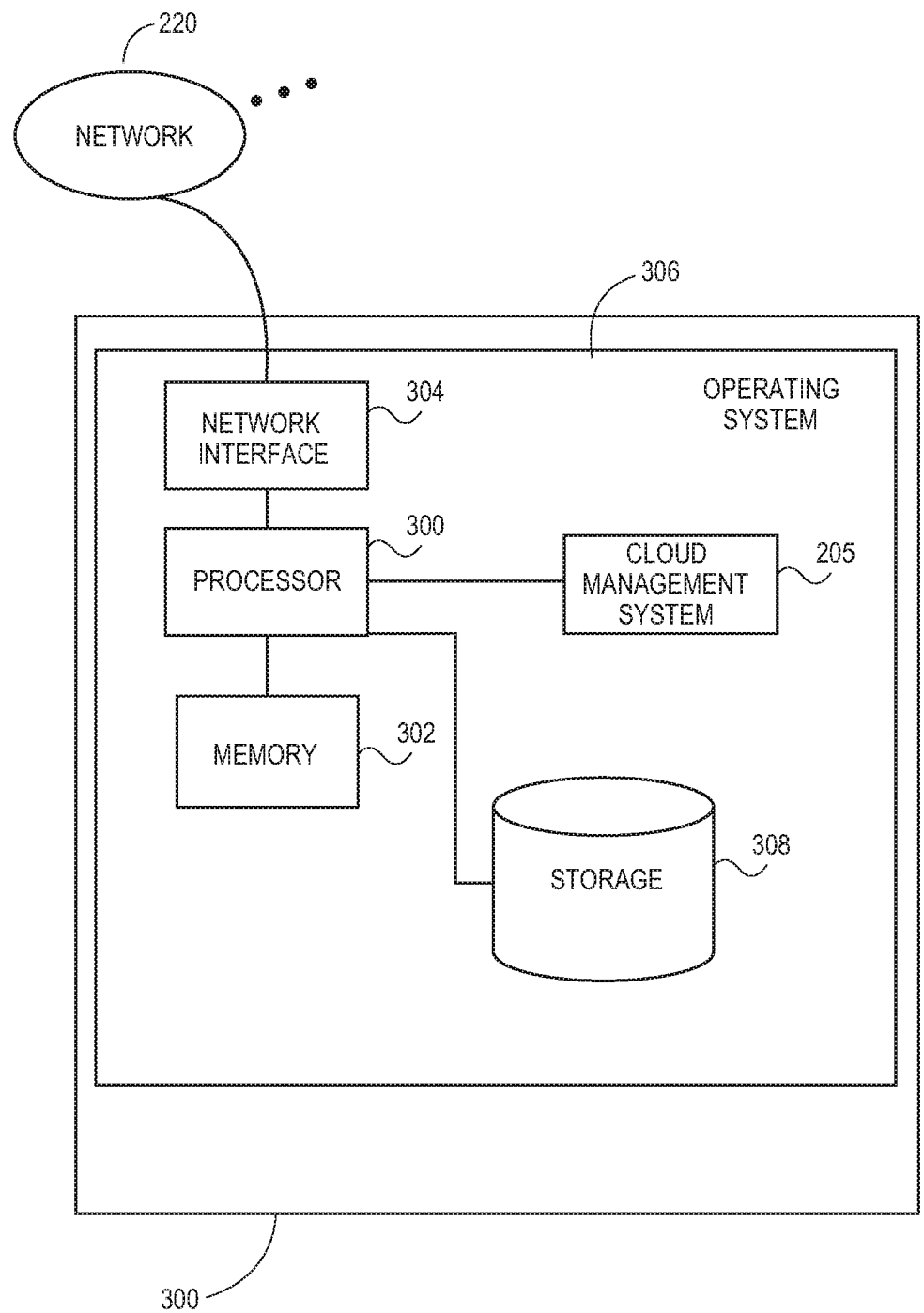
FIG. 4 illustrates an exemplary hardware configuration for supporting a cloud management system, according to various embodiments.

FIG. 4 illustrates an exemplary diagram of hardware and other resources that can be incorporated in a computing system 300 and configured to communicate with the non-dedicated resources 210 and third-party controlled resources 215 via one or more networks 220, according to embodiments. In embodiments as shown, the computing system 300 can comprise a processor 300 communicating with memory 302, such as electronic random access memory, operating under control of or in conjunction with operating system 306. Operating system 306 can be, for example, a distribution of the Linux™ operating system, such as SELinux, the Unix™ operating system, or other open-source or proprietary operating system or platform. Processor 300 also communicates with one or more storage device 308, such as hard drives, optical storage, and the like, for maintaining the repository 245 and the record 240. Processor 300 further communicates with network interface 304, such as an Ethernet or wireless data connection, which in turn communicates with one or more networks 220, such as the Internet or other public or private networks.

Processor 300 also communicates with the cloud management system 205, to execute control logic and allow creation of on-demand clouds as described above and below. Other configurations of the computing system 300, associated network connections, and other hardware and software resources are possible.

While FIG. 4 illustrates the computing system 300 as a standalone system including a combination of hardware and software, the computing system 300 can include multiple systems operating in cooperation. The cloud management system 205 can be implemented as a software application or program capable of being executed by the computing system 300, as illustrated, or other conventional computer platforms. Likewise, the cloud management system 205 can also be implemented as a software module or program module capable of being incorporated in other software applications and programs. In either case, the cloud management system 205 can be implemented in any type of conventional proprietary or open-source computer language.

Figure 5:
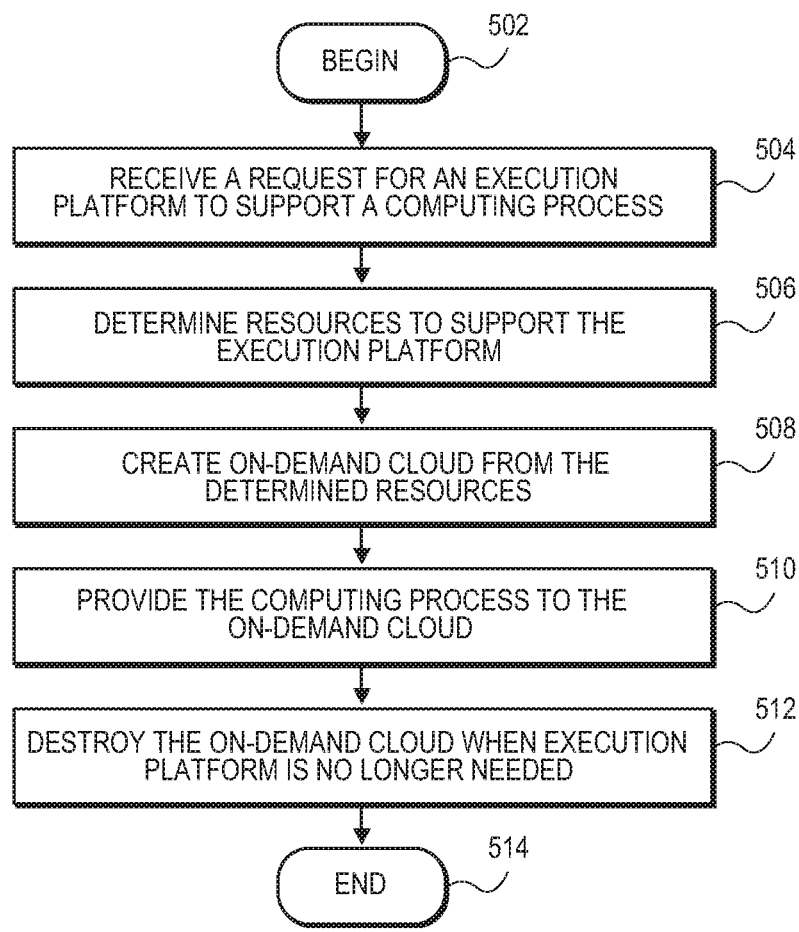
FIG. 5 illustrates a flowchart for providing an on-demand cloud computing environment, according to various embodiments.

FIG. 5 illustrates a flow diagram of providing on-demand clouds, according to embodiments. In 502, processing can begin. In 504, the cloud management system 205 receives a request 230 for an execution platform to support a computing process. The computing process can include applications, appliances, virtual machines, and the like. The request 230 can also include the specifications of the computing process. For example, the request 230 can include information identifying the desired resources for the computing process (processing power, memory, network bandwidth, etc.), the time period for the computing process (start time, end time, duration), and the like. The request 230 can be initiated by the operator or owner of the cloud management system 205. Likewise, the cloud management system 205 can receive the request 230 from a separate entity.

In 506, the cloud management system 205 determines resources to support the execution platform. The cloud management system 205 can identify a set of resources from the non-dedicated resources 210 and third-party controlled resources 215 that matches the specifications of the computing process. To identify the set of resources, the cloud management system 205 can directly query the non-dedicated resources 210 and third-party controlled resources 215 to determine the available resources. Likewise, the cloud management system 205 can maintain a record 240 that identifies the available resources of the non-dedicated resources 210 and third-party controlled resources 215.

In 508, the cloud management system 205 creates an on-demand cloud from the determined resources. To create the on-demand cloud 235, the cloud management system 205 can request allocation of the identified resources from the non-dedicated resources 210 and third-party controlled resources 215. If the cloud management system 205 has direct control of the resources, the cloud management system 205 can directly allocate the resources to the on-demand cloud 235.

In 510, the cloud management system 205 provides the computing process to the on-demand cloud. The cloud management system 205 can instantiate the computing process in the on-demand cloud 235. Likewise, the cloud management system 205 can provide interfaces (APIs, communication channels, etc.) for the requester to access the on-demand cloud 235.

In 512, the cloud management system 205 destroys the on-demand cloud when the execution platform is no longer needed. The cloud management system 205 can destroy the on-demand cloud at the expiration of the duration of the on-demand cloud or at the direction of the requester of the computing process. To destroy the on-demand cloud 235, the cloud management system 205 can request de-allocation of the identified resources from the non-dedicated resources 210 and third-party controlled resources 215. If the cloud management system 205 has direct control of the resources, the cloud management system 205 can directly de-allocate the resources to the on-demand cloud 235.

Then, in 514, the process can end, but the process can return to any point and repeat.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
receiving, by a cloud management system, a request initiated by a requestor to provide an execution platform to execute one or more applications, wherein the request comprises a specification of the execution platform;
identifying, from a record of available computing resources maintained by the cloud management system, a set of computing resources in view of the specification, wherein the record of available computing resources comprises an indication of a first type of available computing resources and an indication of a second type of available computing resources, wherein the first type of available computing resources comprises cloud-controlled computing resources controlled by the cloud management system, and the second type of available computing resources comprises internally-controlled computing resources controlled by the requestor and third-party controlled computing resources, and wherein the set of computing resources comprises at least one cloud-controlled computing resource and at least one internally-controlled computing resource;
creating, by the cloud management system, the execution platform using the identified set of computing resources;
instantiating, by the cloud management system, the one or more applications on the execution platform;
providing, by the cloud management system, to the requestor access to the one or more applications;
responsive to determining that the request has expired, de-allocating, by the cloud management system, the at least one cloud-controlled computing resource of the set of computing resources; and
requesting, by the cloud management system, that the requestor de-allocate the at least one internally-controlled computing resource of the set of computing resources.

2. The method of claim 1, wherein the request is received via a network interface.

3. The method of claim 1, wherein the request comprises a time duration for which the identified set of computing resources is requested.

4. The method of claim 1, wherein the request identifies an operating system to support the one or more applications on the execution platform.

5. The method of claim 1, further comprising generating a resource aggregation table identifying a set of resource servers to run the identified set of computing resources.

6. The method of claim 1, further comprising transmitting a virtual machine instantiation command to a set of resource servers running the identified set of computing resources.

7. The method of claim 1, further comprising generating a record of usage of the identified set of resources by the one or more applications.

8. A system comprising:
a memory; and
a processing device, operatively coupled to the memory, to:
receive a request initiated by a requestor to provide an execution platform to execute one or more applications, wherein the request comprises a specification of the execution platform;
identify, from a record of available computing resources maintained by a cloud management system, a set of computing resources in view of the specification, wherein the record of available computing resources comprises an indication of a first type of available computing resources and an indication of a second type of available computing resources, wherein the first type of available computing resources comprises cloud-controlled computing resources controlled by the cloud management system, and the second type of available computing resources comprises internally-controlled computing resources controlled by the requestor and third-party controlled computing resources, and wherein the set of computing resources comprises at least one cloud-controlled computing resource and at least one internally-controlled computing resource;
create the execution platform using the identified set of computing resources;
instantiate the one or more applications on the execution platform;
provide to the requestor access to the one or more applications;
responsive to determining that the request has expired, de-allocate the at least one cloud-controlled computing resource of the set of computing resources; and
request that the requestor de-allocate the at least one internally-controlled computing resource of the set of computing resources.

9. The system of claim 8, wherein the request is received via a network interface.

10. The system of claim 8, wherein the request comprises a time duration for which the identified set of computing resources is requested.

11. The system of claim 8, wherein the request identifies an operating system to support the one or more applications on the execution platform.

12. The system of claim 8, wherein the processing device is further to generate a resource aggregation table identifying a set of resource servers to run the identified set of computing resources.

13. The system of claim 8, wherein the processing device is further to transmit a virtual machine instantiation command to a set of resource servers running the identified set of computing resources.

14. The system of claim 8, wherein the processing device is further to generate a record of usage of the identified set of resources by the one or more applications.

15. A non-transitory computer-readable medium comprising instructions that, when executed by a processing device, cause the processing device to:
receive, by the processing device, a request initiated by a requestor to provide an execution platform to execute one or more applications, wherein the request comprises a specification of the execution platform;

identify, from a record of available computing resources maintained by a cloud management system, a set of computing resources in view of the specification, wherein the record of available computing resources comprises an indication of a first type of computing resources and an indication of a second type of available computing resources, wherein the first type of available computing resources comprises cloud-controlled computing resources controlled by the cloud management system, and the second type of available computing resources comprises internally-controlled computing resources controlled by the requestor and third-party controlled computing resources, and wherein the set of computing resources comprises at least one cloud-controlled computing resource and at least one internally-controlled computing resource;

create the execution platform using the identified set of computing resources;

instantiate the one or more applications on the execution platform;

provide to the requestor access to the one or more applications;

responsive to determining that the request has expired, de-allocate the at least one cloud-controlled computing resource of the set of computing resources; and requesting that the requestor de-allocate the at least one internally-controlled computing resource of the set of computing resources.

16. The non-transitory computer-readable medium of claim 15, wherein the request is received via a network interface.

17. The non-transitory computer-readable medium of claim 15, wherein the request comprises a time duration for which the identified set of computing resources is requested.

18. The non-transitory computer-readable medium of claim 15, wherein the request identifies an operating system to support the one or more applications on the execution platform.

19. The non-transitory computer-readable medium of claim 15, wherein the processing device is further to generate a resource aggregation table specifying a set of resource servers to run the identified set of computing resources.

20. The non-transitory computer-readable medium of claim 15, wherein the processing device is further to transmit a virtual machine instantiation command to a set of resource servers running the identified set of computing resources.

* * * * *